US011503227B2

United States Patent
Pinskaya et al.

(10) Patent No.: US 11,503,227 B2
(45) Date of Patent: Nov. 15, 2022

(54) SYSTEMS AND METHODS OF TRANSITIONING BETWEEN VIDEO CLIPS IN INTERACTIVE VIDEOS

(71) Applicant: Very 360VR LLC, Woodland Hills, CA (US)

(72) Inventors: Lina Pinskaya, Woodland Hills, CA (US); Yuriy Borodulin, San Jose, CA (US)

(73) Assignee: VERY 360 VR LLC, Woodland Hills, CA (US)

( * ) Notice: Subject to any disclaimer, the term of this patent is extended or adjusted under 35 U.S.C. 154(b) by 78 days.

(21) Appl. No.: 17/005,226

(22) Filed: Aug. 27, 2020

(65) Prior Publication Data

US 2021/0084239 A1 Mar. 18, 2021

Related U.S. Application Data

(60) Provisional application No. 62/902,003, filed on Sep. 18, 2019.

(51) Int. Cl.
| | |
|---|---|
| *H04N 5/262* | (2006.01) |
| *G11B 27/00* | (2006.01) |
| *G11B 33/02* | (2006.01) |
| *G06V 20/40* | (2022.01) |

(52) U.S. Cl.
CPC ......... *H04N 5/2622* (2013.01); *G06V 20/46* (2022.01); *G06V 20/49* (2022.01); *G11B 27/005* (2013.01); *G11B 33/025* (2013.01); *H04N 5/2621* (2013.01)

(58) Field of Classification Search
CPC .... H04N 5/2622; H04N 5/2621; H04N 5/272; G06V 20/46; G06V 20/49; G11B 27/005; G11B 33/025
See application file for complete search history.

(56) References Cited

U.S. PATENT DOCUMENTS

| | | |
|---|---|---|
| 6,285,380 B1 | 9/2001 | Perlin |
| 7,688,346 B2 | 3/2010 | Richards |
| 8,471,898 B2 | 6/2013 | Neuman |
| 9,552,675 B2 | 1/2017 | Walters |
| 9,704,298 B2 | 7/2017 | Espeset |
| 10,134,137 B2 | 11/2018 | Zaitsev |
| 10,218,793 B2 | 2/2019 | Auten |

(Continued)

OTHER PUBLICATIONS https://www.youtube.com/watch?time_continue=1&v=OCQYT0hd_Il&feature=emb_logo; SeekBeak.com Explainer Video; SeekBeak—360 Photo & Virtual Tour Platform; Aug. 21, 2016; downloaded on Aug. 27, 2020.

(Continued)

*Primary Examiner* — Girumsew Wendmagegn
(74) *Attorney, Agent, or Firm* — Lynch LLP

(57) ABSTRACT

Systems and methods described in this application are directed to creating interactive stories using static 360-degree environments with dynamic sprites displayed thereon. These techniques facilitate creation of gamified storytelling and improve on prior efforts to create an immersive experience. Some embodiments described in this application are directed to creating video clips with assistance to improve continuity between clips while other embodiments are directed to transitioning between those clips in the course of presenting an interactive story to a user.

4 Claims, 3 Drawing Sheets

(56) References Cited

U.S. PATENT DOCUMENTS

| | | |
|---|---|---|
| 10,237,537 B2 | 3/2019 | Donovan |
| 10,272,329 B2 | 4/2019 | Linder |
| 10,284,753 B1 | 5/2019 | Naik |
| 2009/0305204 A1 | 12/2009 | Connolly |
| 2014/0087877 A1 | 3/2014 | Krishnan |
| 2016/0191893 A1 | 6/2016 | Gewickey |
| 2017/0103562 A1 | 4/2017 | Mitchell |
| 2017/0286993 A1 | 10/2017 | Khalid |
| 2018/0253894 A1 | 9/2018 | Krishnan |
| 2018/0286053 A1 | 10/2018 | Labbe |
| 2018/0318709 A1 | 11/2018 | Metelko |
| 2019/0037234 A1* | 1/2019 | Ahonen ................. H04N 19/59 |
| 2019/0214055 A1* | 7/2019 | Alexandru ............. G11B 27/34 |
| 2020/0059691 A1* | 2/2020 | Seo .................. H04N 21/44016 |

OTHER PUBLICATIONS https://www.youtube.com/watch?v=JA4z8P_B2B0; How to Add Video Inside Your 360 Video: Premiere Pro Tutorial; The 360 Guy, May 16, 2018; downloaded on Aug. 27, 2020.

\* cited by examiner

SYSTEMS AND METHODS OF TRANSITIONING BETWEEN VIDEO CLIPS IN INTERACTIVE VIDEOS

This application claims priority to U.S. Provisional Patent Application Ser. No. 62/902,003, filed Sep. 18, 2019. All extrinsic materials identified in this application are incorporated by reference in their entirety.

FIELD OF THE INVENTION

The field of the invention is interactive real-time video sequencing with smooth transitions.

BACKGROUND

The background description includes information that may be useful in understanding the present invention. It is not an admission that any of the information provided in this application is prior art or relevant to the presently claimed invention, or that any publication specifically or implicitly referenced is prior art.

360-degree photographs can be used in a variety of different contexts, but few have used these to create interactive content. To make a 360-degree photographs even more interactive, video content can be introduced into the foreground of such a 360-degree photo. For example, a 360-degree photo of a room can act as a background and a video of an actor sitting in a chair can act as a foreground video. But this can lead to a somewhat jarring appearance of a video superimposed over a background. To improve visual continuity between a video and a 360-degree photo over which the video is placed, such videos can be turned into sprites where extraneous video is removed and only the focus of the video (e.g., the actor) is kept. Thus, an actor can appear as if they exist within a room despite being shot in a different location.

But to create an interactive experience for a viewer, other elements can be introduced that a user can interact with, and user engagement with those elements can impact the video sprites. In ordinary games, sprites are rendered in real time, and thus transitions from one portion of a story or action into another can be accomplished in real time without any obvious visual transition that takes away from the experience of the game. When sprites are comprised of video content and gamified, a system must be able to transition from one shot to another without the obvious appearance of changing from one video clip to another.

In computer generated games, sprite images are fully digitally generated by software packages. These images lack the photorealism of live footage, but it is trivial to direct software to re-generate the same image multiple times. To string sprite sets together sequentially, the last image of one sprite set can be the same as the first image of the next sprite set, making authoring multiple sets of compatible sprites a simple task. In contrast, producing compatible sprites from live action footage is not trivial. But since sprites generated from live action footage are inherently more realistic looking, it would be advantageous to be able to create live action sprite sets that can be played sequentially without abrupt and obvious transitions between sprite sets.

Thus, there exists a need in the art for systems and methods designed to improve transitions between video clips to facilitate gamified, interactive videos.

SUMMARY OF THE INVENTION

The present invention provides systems and methods directed to interactive story telling. In one aspect of the inventive subject matter, a method of facilitating video transitions is contemplated, the method comprising the steps of: initiating, on a user device, playback of a first video, the first video comprising a first video transition frame; identifying, by the user device, a set of idle videos to which the first video can transition, where idle videos in the set of idle videos are identified at least according to the first video transition frame; upon completing playback of the first video, initiating, on the user device, playback of an idle video from the set of idle videos; identifying, by the user device, a set of subsequent videos at least based on the idle video metadata; while the idle video is playing, receiving a user response via the user device; and upon completing playback of the idle video, initiating playback of a subsequent video from the set of subsequent videos.

In some embodiments, each idle video in the set of idle videos begins with a frame similar to the first video transition frame, and the first video transition frame can be a final frame of the first video. In some embodiments, the method includes the step of selecting, by the user device, the idle video from the set of idle videos at random, and the method can also include the step of selecting, by the user device, the subsequent video from the set of subsequent videos is based on the user response.

In some embodiments, the step of identifying a set of subsequent videos further comprises basing idle video identification on an idle video transition frame of the idle video. The method can additionally include the step of identifying, by the user device, a second set of idle videos to which the subsequent video can transition, wherein idle videos in the second set of idle videos are identified at least according to a transition frame from the subsequent video. All videos can be stored remotely on a server.

In another aspect of the inventive subject matter, a method of facilitating video transitions is contemplated, the method comprising the steps of: initiating, on a user device, playback of a first video, the first video comprising a first video transition frame; identifying, by a server, a set of idle videos to which the first video can transition, wherein idle videos in the set of idle videos are identified at least according to the first video transition frame; on the user device, upon completing playback of the first video, initiating playback of an idle video from the set of idle videos; identifying, by the server, a set of subsequent videos at least based on the idle video metadata; while the idle video is playing, receiving, at the server, a user response via the user device; and upon completing playback of the idle video, initiating, on the user device, playback of a subsequent video from the set of subsequent videos.

One should appreciate that the disclosed subject matter provides many advantageous technical effects including smoother transitions between video clips as well as systems to create video clips to facilitate such transitions.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
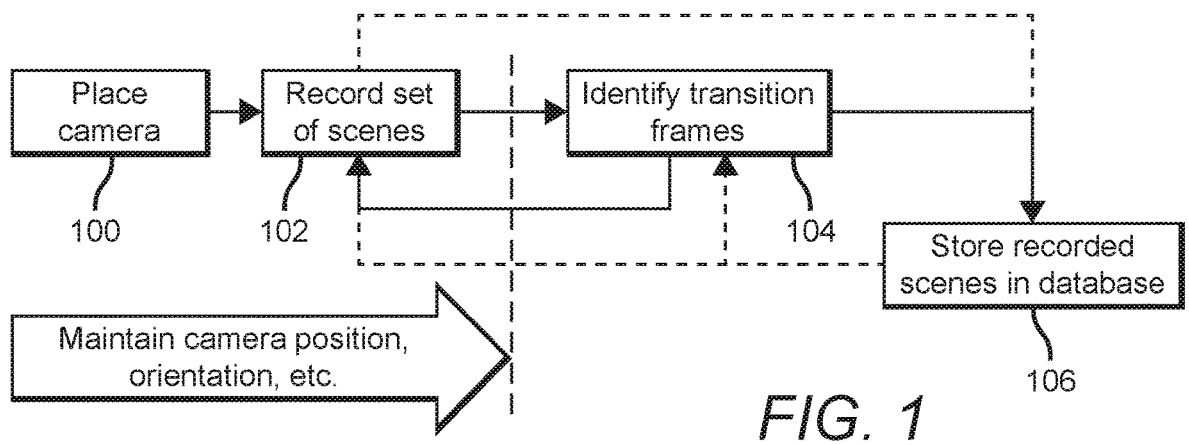
FIG. 1 is a flowchart demonstrating how video scenes can be recorded and stored.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Systems and methods of the inventive subject matter can be used in a variety of different contexts to blend different videos together as seamlessly as possible. Chaining videos together can be important to facilitate a wide variety of different activities, including creating interactive videos where users are able to make selections that affect the course of a storyline that plays out in a series of videos. Thus, when a first video ends, a second video can be appended to the first video. But this can lead to the appearance of a stutter in instances where the ending of the first video does not match with the beginning of the second video. Systems and methods of the inventive subject matter facilitate improved video matching to create more seamless transitions between different video segments. In this application, the terms scene, video clip, clip, and video are often used interchangeably in various contexts and should be understood as referring to either an ordinary video clip or a video clip as a sprite (discussed below in more detail).

One area in which embodiments of the inventive subject matter are especially useful is in interactive videos (e.g., gamified videos). For example, current systems that play conventional 360-degree movies on smart mobile devices offer limited interactive functionality. Though users can change viewing angles (e.g., by moving their smart devices around), users generally cannot interact with these types of videos to influence the movie's storyline. Embodiments of the inventive subject matter facilitate new levels of interactivity by allowing users interact with aspects of a video to influence how a that video proceeds. In some embodiments, for example, systems and methods of the inventive subject matter make it possible to transition between different pre-recorded live-action video clips that are super-imposed over a 360-degree still picture acting as a background, thereby creating an interactive scene. Systems and methods directed to facilitating smooth transitions between different pre-recorded clips are described in more detail below.

Before pre-recorded clips can be subject to interaction and transition, they must be recorded. How pre-recorded clips are recorded can make it easier to create smooth transitions between video clips. FIG. 1 is a flow chart describing steps to create pre-recorded clips that facilitate transitioning between one another.

Figure 2:
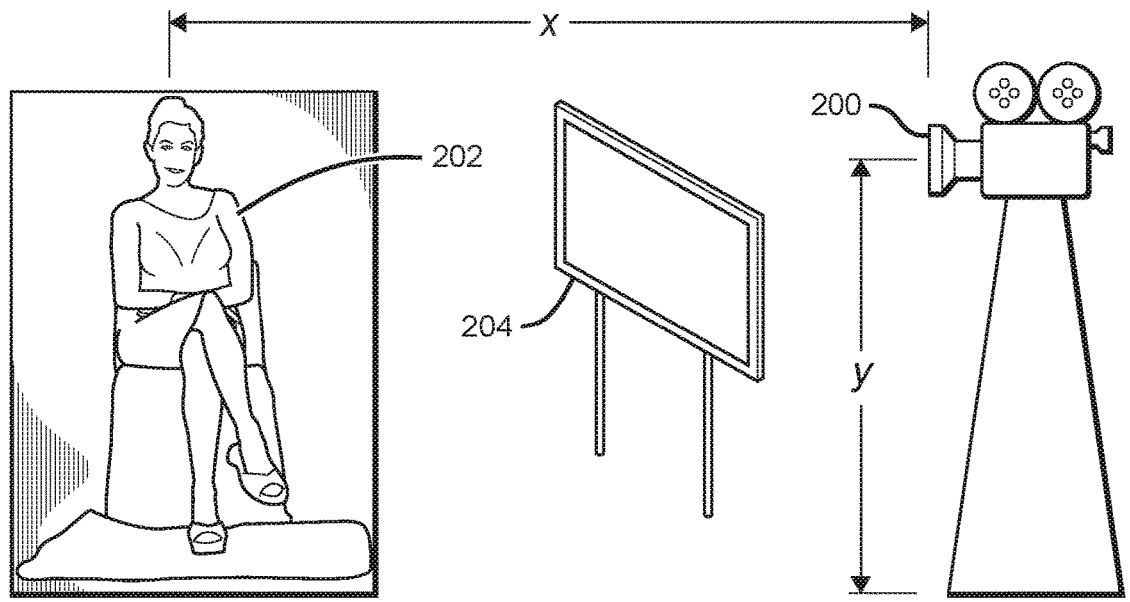
FIG. 2 shows how a first scene can be recorded.

First, according to step 100, a camera is placed in position to record a scene. FIG. 2 shows an example of how a first scene is set up. When camera 200 is put into position it is placed so that actor 202 is in the camera's shot. Information about the camera's positioning relative to the actor, such as distance (x) from the actor and height (y) that the camera is mounted at, is recorded. Other information such as camera orientation (tilt angle, etc.), zoom, and lens filters (e.g., real filters or digitally applied filters) can also be recorded to improve continuity between shots.

Scenes of the inventive subject matter can be used in a variety of ways, one of which is to turn a pre-recorded scene featuring an actor into a sprite (e.g., a series of two-dimensional images that can be shown sequentially to create an animation). Once a scene is converted into a sprite (e.g., by removing the background but leaving the actor), it can be added into the foreground of a 360-degree image, thereby reducing computing and memory requirements associated with rendering an entire 360-degree video. Traditional 360-degree video footage captures information in every direction at the same time, which requires high resolution and large amounts of storage. This makes 360-degree video impractical for low-storage devices such as smart phones and tablets. This is especially true for interactive 360-degree videos since they require multiple alternative videos to cover responses to all possible user actions.

Using sprites solves this problem without compromising interactivity. Sprites use much less memory and processing power resources than 360-degree videos, and thus using sprites over a 360-degree photograph background dramatically reduces memory and storage requirements for embodiments of the inventive subject matter. This can be especially useful for embodiments that can be accessed over an internet connection (e.g., a web-based game or other interactive web-based implementation) or implementations that are limited by a smart device's storage capacity and performance capabilities.

Many different types of scenes can be shot for use in association with systems and methods of the inventive subject matter, all of which facilitate or encourage interactivity. For example, action clips lead a viewer to perform some action in response to the video clip (for example, an actor in the scene might ask a viewer to locate a particular object in the virtual scene, constructed in the final interactive video).

Response clips involve a reaction from an actor in response to a viewer's action. Responses range from very negative to very positive, and response clips can be specific to a situation or generic and reusable. Response-action video clips require a user to perform an additional action.

Info video clips do not require any viewer response. For example, at the beginning of a response-action clip, an intro video clip can be shown in which an actor explains what interactions are supported; at the end, the system then plays a conclusion info clip in which the actor indicates that the interactive video is has ended.

Idle video clips are silent clip in which an actor is idle. These clips can be used while waiting for a viewer's input.

Transition clips are also silent and are designed to facilitate an actor transitioning from one pose to another. For example, a transition clip can be used when the next portion of a story begins with an actor standing when the current portion ends with the actor sitting. A transition clip would thus feature the actor moving from a sitting position to a standing position.

The term "pre-recorded scene" can refer to any type of scene described above and sets of scenes comprise at least one pre-recorded scene.

Metadata can also be associated with any video clip of the inventive subject matter. For example, some video clips can be looped by ensuring the video clip's end frame (or frames) is the same or at least substantially similar to its beginning frame (or frames), while other videos can be played forward and backward in sequence any amount of times. Whether a video is loopable can be indicated in the video clip's metadata. In some embodiments, all idle-type video clips are loopable. Metadata can also indicate a type of transition pose in a transition ID (e.g., seated with legs crossed) as well as a type of action clip in an action ID (e.g., grab object A). Response clips can include metadata to indicate, e.g., a range index between 1 and 9 (1 being extremely negative and 9 being extremely positive). Response clips can also include metadata indicating if the response is specific to a task and, if so, it can indicate which action IDs are associated with the response clip. Scene metadata can be stored in RAM in the form of a lookup table (or simplified database). Metadata can be looked up based on any scene attribute discussed in this application, including scene id, start and end transition poses, type of scene (e.g. action-required clip, generic negative response, intro, transition, etc.)

With a camera in place, a first set of scenes can be recorded according to step 102. Once a scene (or set of scenes) is recorded a transition frame in each recorded scene can be identified according to step 104. A transition frame refers to a frame or set of frames from an end portion of the first scene (e.g., the final frame or frames from the first scene). Once transition frames are identified, the recorded scenes can be saved to a database according to step 106. In some embodiments, an actor in a scene is given instructions to strike transitions poses at both the beginning and end of a scene (e.g., so that the scene being recorded can fit between two different scenes). This is especially true for response clips where, no matter what the response is (e.g., negative, neutral, positive), the scene should begin with a first transition pose and end with a second transition pose, where, e.g., the first transition pose can be the same or different from the second transition pose. In some embodiments, each scene is recorded directly to such a database according to the dotted line connecting step 102 to step 106 and, thus, transition frames are identified within each scene as it exists within that database according to the dotted line connecting step 106 to step 104. In some embodiments, transition frames are identified after multiple sets of scenes are stored in a database. This possibility is demonstrated by a dotted line going from step 102 to 106 and another dotted line going from step 106 to step 104. In such an embodiment, step 104 can be the final step of processing a first set of videos. Transition scene identification can occur at any time after a scene is recorded, regardless of where the scene is stored.

With a first set of scenes each having identified transition frames recorded, a second set of scenes can be shot (second scenes can be shot even with only a single first scene having an identified transition frame, but for the sake of an explanatory example, this paragraph focuses on a situation where transition frames are identified for each of the scenes in the first set). The second set of scenes can be recorded after identifying transition frames (step 104) or after the first set of scenes are stored to a database (step 106). Each of these possibilities is shown by dotted lines connecting steps 104 and 106 to step 102. In some embodiments, each scene can be shot and immediately recorded to storage by using specialized software to facilitate scene storage. The second set of scenes are shot such that they can be played after various scenes from the first set of scenes, and thus use the transition frames from the first set of scenes as launching points to begin each of the second scenes. This application discusses a first set and a second set for demonstrative purposes. It should be understood from the figures as well as the accompanying description that embodiments of the inventive subject matter are intended to loop or iterate as many times as necessary to a reach a story's conclusion, thus leaving open the possibility for many additional sets.

Thus, the flowchart in FIG. 1 shows a loop back to step 102 from step 106, indicating that once a set of scenes (where, e.g., a set can have a single scene in it) is recorded and transition frames are identified for each scene in the set, a second set of scenes can be shot. This process can be undertaken as many times as necessary to complete a story or set of stories that are intended to give a user (e.g., a viewer) the ability to influence the direction of the story as they experience it. Each subsequent set of scenes typically requires maintaining camera position, orientation, and other camera settings described in this application.

To increase scene compatibility (e.g., to increase the number of scenes that a given scene can be matched with), transition scenes (mentioned above) can also be shot. For a transition scene, an actor can be instructed to strike several poses both at the beginning and at the end of a transition scene, where the poses are influenced by transition frames as well as an actor's pose at the beginning of certain scenes. For example, if a transition frame features an actor sitting with her hands at her sides and a second scene begins with the actor sitting with her hands in her lap, then the transition scene can show the actor transitioning from sitting with hands at sides to sitting with hands in lap so that the second scene can be played after the first scene without interrupting continuity.

Figure 3:
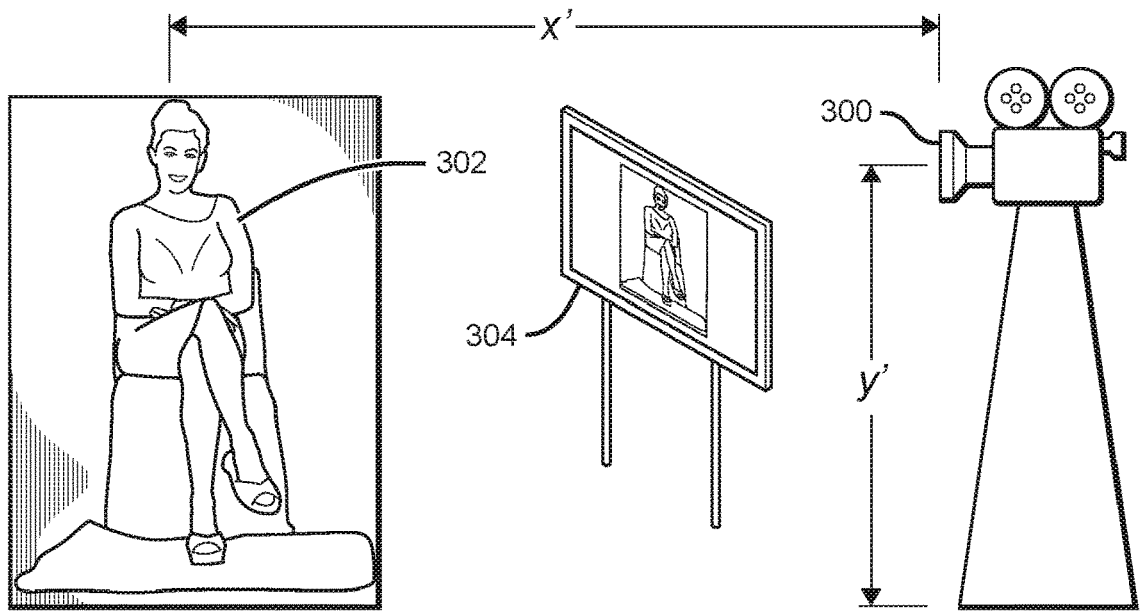
FIG. 3 shows how a second scene can be recorded.

As briefly mentioned above, to create a second set of pre-recorded scenes that can be played after scenes from the first set of scenes, as shown in FIG. 3, camera 300 is positioned relative to the actor (or other focus of the scene) as close to identically as possible as it was during recording of the first set of scenes. The camera's various setting, such as filters, zoom level, etc., should also be matched. In some embodiments, the camera remains unmoved and untouched after recording the first set of scenes to ensure camera continuity.

As shown in FIG. 3, a distance between camera 300 and actor 302 expressed as x' (where actor 302 can be the same actor as actor 202) is approximately equal to distance x as shown in FIG. 2. The same relationship is true for y and y', where y is approximately equal to y'. Moreover, camera 300 should be oriented similarly to camera 200. In some embodiments, a first set of pre-recorded scenes can be shot during the same shoot (e.g., a day of shooting) as the second set of pre-recorded scenes (among other pre-recorded scenes). Thus, the same camera can be left in place while an actor recites different lines and acts out different pre-recorded scenes of an interactive video. The same can be true when there are no actors within a scene, where continuity is created in the same way by working to match end frames from a first scene with starting frames of a second scene. In addition to camera position and orientation, other camera parameters should be matched between scenes, such as optical parameters (e.g., focus, exposure, etc.)

Figure 4:
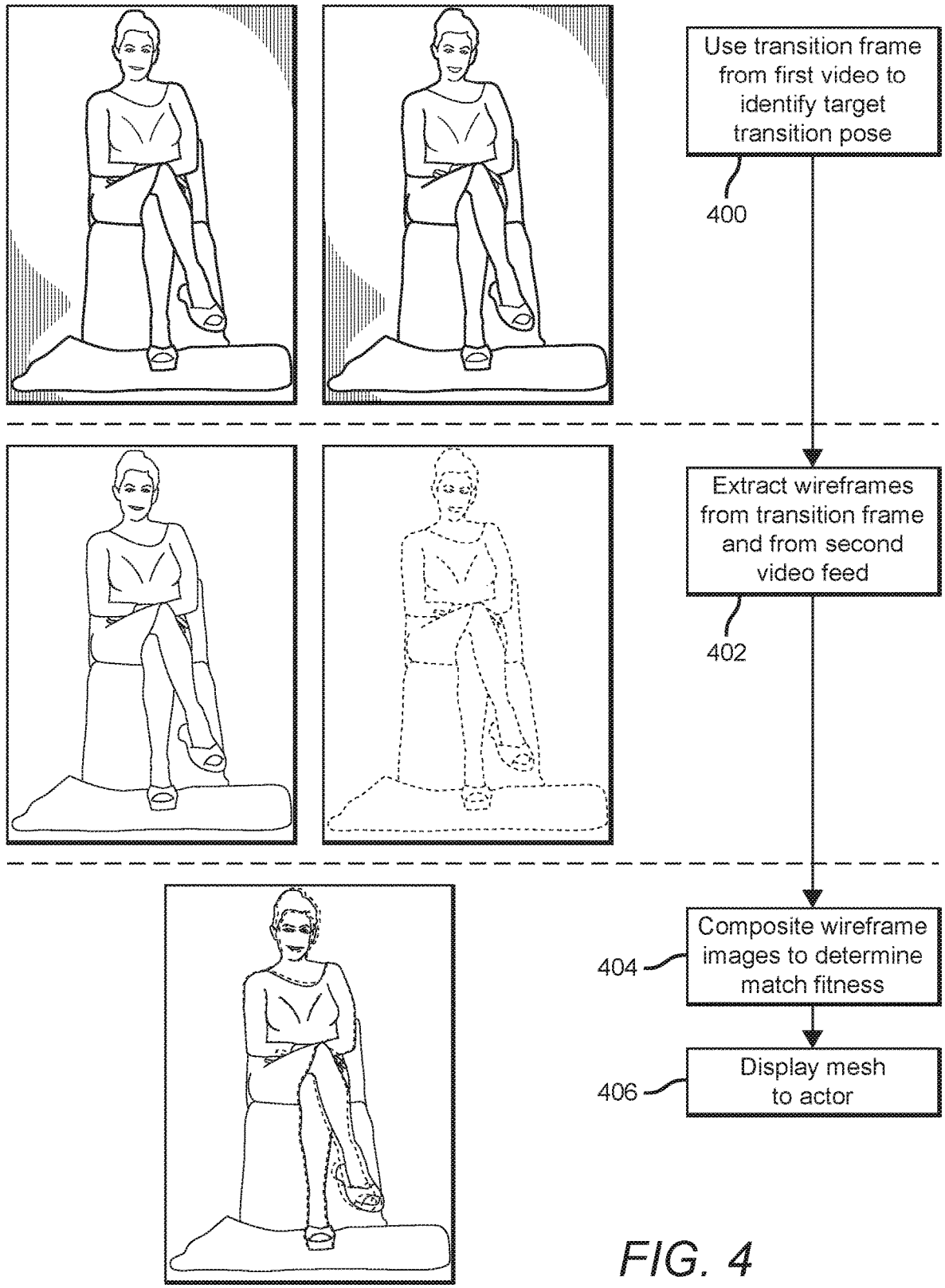
FIG. 4 shows an example of how an image can be created that shows an actor how similar a current pose is to a pose from a transition frame.

In addition to using transition scenes, scene compatibility can be improved by having an actor work to match starting poses for new scenes with poses held in transition frames from previous scenes. For example, if a first scene ends with an actor in a first pose, a second scene can then be recorded where the actor tries to strike the same pose in the beginning of the second scene as they were in when the first scene ended. This can be facilitated by specialized computer software that displays to an actor transition frame of a first scene when shooting a second scene. As shown in FIGS. 2 and 3, display screens 204 and 304 can be positioned to face their respective actors. Because FIG. 2 shows a first pre-recorded scene being recorded (e.g., no scene comes before it in a story), display screen 204 is blank. But because FIG. 3 shows a second pre-recorded scene that is intended to be played after the first pre-recorded screen, it displays to actor 302 how closely their current pose matches with a final pose from the first pre-recorded scene. FIG. 4 shows how scene matching can be done in more detail. This technology can also be used to help an actor create transition scenes.

FIG. 4 shows how systems and methods of the inventive subject matter make it easier for an actor to match a previous pose. This can be applied to any type of scene, with or without an actor, to improve continuity between shots. This system works by showing an actor a display screen that illustrates how similarly they are posing relative to a transition frame that serves as a reference for the actor. In the example shown in FIGS. 2 and 3, the actor in FIG. 2 records a first scene, and the same actor shown in FIG. 3 then records a second scene that is intended to be played immediately following conclusion of the first scene. Systems and methods of the inventive subject matter can facilitate playing any number of different scenes after the first scene, including the second scene, so it is advantageous to facilitate smooth transitions from the end of a first scene to the beginning of subsequent scenes (or another scene, depending on a user interaction).

FIG. 4 demonstrates how an image indicating how well an actor has matched a pose from a previous scene can be created using one or more computing devices. For purposes of discussion, a single computing device is described, and it should be understood that the computing device can be, e.g., one or more personal computers or it can be one or more remote servers, including cloud servers or any of the other hardware components described in this application regarding computing devices. It should also be understood that any time a computing device is described as carrying out an action it means that computing device is executing or has executed software code that configures or configured the computing device to carry out that action.

First, a transition frame is needed. In some embodiments, the transition frame is the last frame from the first scene. In some embodiments, the transition frame can be selected manually or algorithmically based on its fitness for pose replication (e.g., the transition frame is selected because the actor is in a static position rather than a dynamic one). It is contemplated that in situations where the transition frame is not the final frame of a scene, the scene can be trimmed such that the transition frame is made into the final frame of the scene.

Thus, phase 400 shows the transition frame in the left column and it shows a camera feed of the actor getting situated to record the second scene in the right column. As shown in phase 402, specialized software running on a computing device takes both the transition frame and the camera feed to create wireframe outlines of the actor and other visible objects in each. The left column thus shows a wireframe outline of the transition frame (e.g., a static image) while the right column shows a wireframe of the camera feed showing the actor in front of the camera preparing to shoot the second scene. The wireframe in the right column is dynamic, while the wireframe in the first column is static. In some embodiments, neither of these wireframes is shown on any display screen and are instead managed by software only.

Phase 404 involves creating a composite of both the static wireframe. Thus, the wireframe image of the transition frame and the wireframe image of the actor in front of the camera preparing to shoot the second scene are combined into a single image. Overlapping wireframe lines can be highlighted by using different colors. For example, the transition frame wireframe can be shown with a green line, the wireframe of the actor preparing to shoot the second scene can be shown in red, and when those wireframes overlap in the composite image, the overlapping portions can be shown in white to give the actor visual feedback as to how similar their pose is to the pose captured in the transition frame.

In phase 406, the composite wireframe image is shown on a display screen, such as display screen 304 shown in FIG. 3. Because the composite image incorporates a live feed of the actor, the actor can use the composite image to adjust their positioning to create the best possible match for a starting frame for the second scene. In some embodiments, wireframe lines shown on a display screen can be made thicker to improve visual feedback. For example, if the wireframe outlines in a composite image are all 1 pixel thick, it will be virtually impossible for an actor to strike a pose matching a pose in a transition frame, but if those lines are made thicker.

Figure 5:
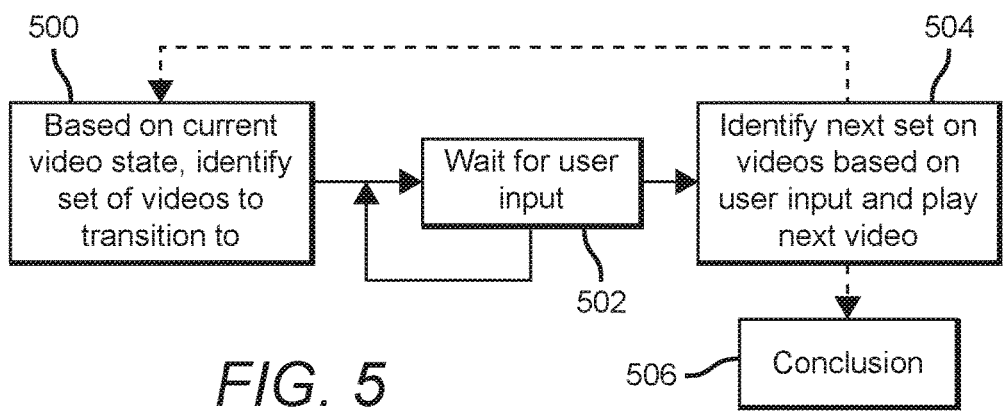
FIG. 5 is a flowchart showing how scenes can be selected for playback while and after a current scene is played.
Figure 6A:
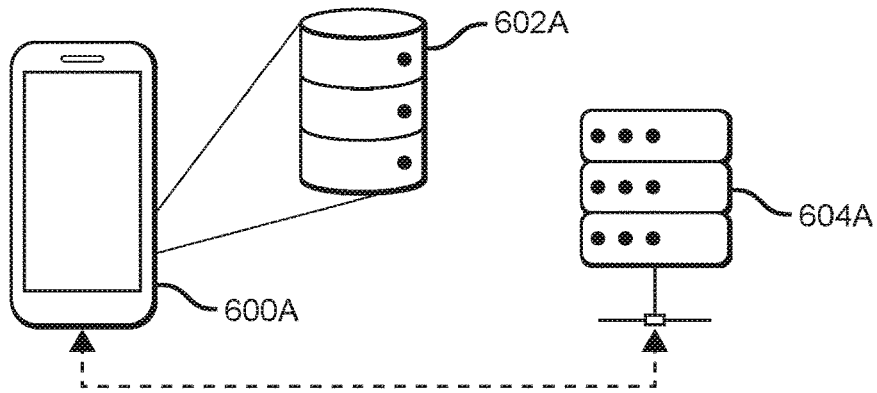
FIG. 6A shows an example of how a client device and a server work together in embodiments of the inventive subject matter.
Figure 6B:
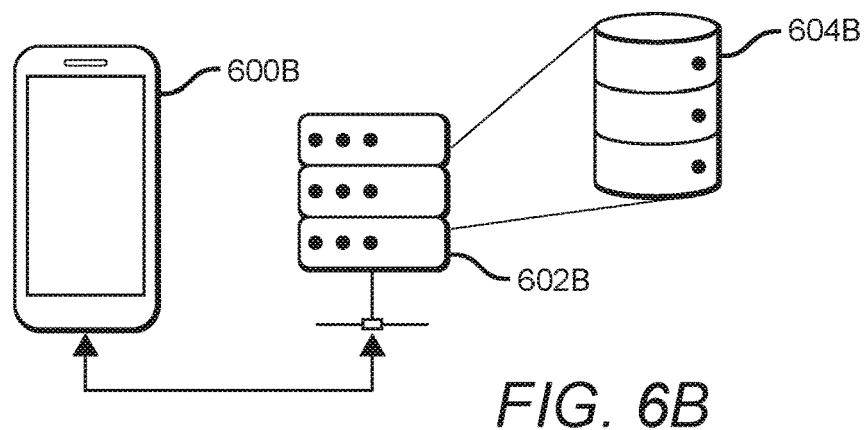
FIG. 6B shows another example of how a client device and a server work together in embodiments of the inventive subject matter.

FIG. 5 is a flowchart showing how user interaction can affect transition from one scene to other scenes. Embodiments of the inventive subject matter make it possible for users to interact with video content by selecting one from a variety of different paths that a story can progress down. Throughout the explanation below, the term "system" is sometimes used to describe how certain steps are executed. This can refer to a user device, a server computer, or both working together. FIGS. 6A and 6B show some example architectures of systems of the inventive subject matter, including an example where a user device stores scenes thereon and the majority of computing is done locally and another example where a user device accesses a website to interact with a story where the majority of computing is done remotely (e.g., on a server or set of servers).

To begin, a scene is played on a user's device. To begin a new story (e.g., before any clip is already playing), a first scene to be played can be automatically selected (e.g., by computer algorithm, at random, based on scene metadata, etc.) by selecting a scene from a set of scenes that can start a new story. Once the scene is playing, scenes are identified that can play after the scene has ended. For example, software on the user device can identify scenes or a server that a user device is connected to can identify scenes. If, for example, the scene is an action scene, the next scene is likely to be an idle scene that plays while the system waits for user input, and thus different idle scenes are identified that can be played once the scene playing during stage 500 concludes. Thus, according to stage 500, at least one scene can be identified for subsequent playback based on a currently video state. Scene matching at this stage can be accomplished using, e.g., scene metadata, scene transition frames, or both, and it is contemplated that all scenes that can be played after the first scene can be identified and placed into a set. The set can include one or more scenes, where each scene in the set is identified by a scene's unique identifier. A subsequent scene (e.g., an idle scene) can then be selected from the set of scenes, where the selection can be made at random. In some instances, e.g., when the scene is not currently visible on a user device's display because the user is not currently watching the scene (e.g., an animated sprite), the system does not need to ensure a smooth transition between scenes.

Using the example above where the scene is an action scene, the system can, e.g., identify subsequent scenes that are all idle scenes. Thus, once the scene has played, the user's device plays an idle scene and enters a waiting stage 502. An idle scene can be selected at random based on pose matching where, e.g., the actor's position in the beginning of the idle scene matches the transition frame of the first scene. During the waiting stage 502, the idle scene is looped, and the system can receive input from a user (e.g., a selection based on a prompt from the first scene). Based on the user's input, and while the idle scene continues to play, the system identifies another set of possible scenes during stage 504.

The next set of scenes generally includes at least one scene as, for example, a user could make a selection during stage 502 that results in a conclusion scene being played during stage 506 and according to step 504. When there is only one conclusion scene, the next set would necessarily contain only that conclusion scene based on the user's selection. In some embodiments, scenes that have already been played can be excluded from the next set (or any other subsequent set, as needed). If a suitable scene to follow an idle scene cannot be identified based on a user selection, a concluding scene can be queued for playback and one or more transition scenes can be sequentially played as needed to ensure smooth transition from a current scene to a concluding scene. Once a scene following an idle scene is playing according to step 504, the system can loop back to stage 500, starting the process over, thereby allowing users to navigate through a story that periodically requires user input to advance.

In some embodiments, while a scene is still playing (e.g., during stage 500) and before the scene is completed, systems and methods of the inventive subject matter can identify subsequent scenes that can be played based on a current frame in the scene and, in some embodiments, also based on the scene's metadata—for the description below, it should be understood that scene metadata can optionally be taken into account. The goal thus to cut off the scene in the smoothest possible way, allowing users to, e.g., circumvent a video they have seen before. To do this, scene candidates are identified by computing differences between a current frame of the scene currently playing and the start frame of a potential subsequent scene (e.g., an idle scene intended to give the user an opportunity to provide user input). Differences and similarities between a current frame of a scene and a starting frame of a potential subsequent scene can be computed using, e.g., Mean Square Error methods such as a Peak Signal-to-Noise Ratio (PSNR). These methods can also help to identify a scene to be played after a currently playing scene based on the currently playing scene's transition frame (e.g., its final frame) in addition to using scene metadata. In some embodiments, scenes can only be cutoff before they have finished playing once an actor in a scene has finished conveying information necessary for the scene (e.g., completed dialog or actions relevant to a story or to the scene).

In another example, if a user provides an input during the waiting stage 502 that leads from a scene ending with an actor sitting down into a subsequent scene where the actor begins in a standing position, one or more of several transition scenes can be played in between the two scenes to create a smooth visual transition from sitting to standing. Thus, the system can also feature scene queuing. In the preceding example, the user provides an input leading from scene A to scene B, but there must exist some transition between scene A and scene B. Thus, the system queues a transition scene to play after scene A where scene B follows the transition scene. In instances where multiple possible transition scenes exist, the system can select one or more transition scene at random, so long as the transition scene(s) facilitate transition from scene A to scene B in terms of actor positioning and scene setup. In some embodiments, a speech recognition module can be included to enable user input comprising a voice command that can be interpreted as a user response sufficient to bring about a scene transition.

FIGS. 6A-6B show how systems of the inventive subject matter described regarding FIG. 5 can be implemented. FIG. 6A shows a user device 600A having local storage 602A (e.g., hard drive space, removeable storage, RAM, cache, and the like) configured to store video clips. In some embodiments, user device 600A can be internet connected as shown by a dotted line connecting the user device 600A to a server 604A, and user device 600A can download video clips from server 604A to be saved to local storage 602A. Any number of video clips can be downloaded and saved to local storage. For example, in some embodiments, all video clips necessary for a story can be downloaded and saved for a user to experience even when no internet connection is available. In another example, video clips can be downloaded only as-needed with local storage 602A acting as space to create a video buffer of content that is about to be played on the user device 600A. FIG. 6A is intended to show how an embodiment where content is accessed through, e.g., a downloadable app can work.

FIG. 6B is intended to show how an embodiment where content is accessed through, e.g., a web browser can work. User device 600B accesses a website that exists on server 602B. Server 602B has access to storage 604B. Storage 604B holds video clips and can also hold other executable software code necessary to bring embodiments of the inventive subject matter to life (in some embodiments, server 602B additionally or alternatively includes executable software code). Storage 604B can exist on server 602B and it can also exist on one or more other servers. Thus, a user device 600B can access a website at server 602B to begin an interactive story of the inventive subject matter where video clips are stored on storage 604B.

Because of the nature of cloud computing and distributed server architecture, although it can be convenient to describe a server as carrying out a variety of different functions, it should be understood that a server can refer to one or any number of servers that operate together to act as a single computing device.

Thus, specific systems and methods of transitioning between video clips have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of facilitating video transitions, the method comprising:
    initiating, on a user device, playback of a first video, the first video comprising a first video transition frame;
    identifying, by a server, a loopable idle video to which the first video can transition, wherein the loopable idle video is identified at least according to the first video transition frame;
    on the user device, upon completing playback of the first video, initiating playback of the loopable idle video;
    while the loopable idle video is playing, prompting a user to select a story path from a set of story paths;
    while the loopable idle video is playing, receiving, at the server, a user response via the user device, the user response comprising the story path selection;
    identifying, by the server, a set of subsequent videos at least based on metadata associated with the user response; and
    upon at least partially completing playback of the loopable idle video, initiating, on the user device, playback of a subsequent video from the set of subsequent videos.

2. The method of claim 1, wherein the loopable idle video begins with a frame similar to the first video transition frame.

3. The method of claim 1, wherein the step of identifying a set of subsequent videos further comprises basing identification of the set of subsequent videos on an idle video transition frame of the idle video.

4. The method of claim 1, wherein an ending frame of the loopable idle video is similar to a first frame of the subsequent video.

* * * * *